Oct. 7, 1930.  J. MAHLER  1,777,853
REPEATING THEODOLITE
Filed June 18, 1929

Inventor:
Josef Mahler

Patented Oct. 7, 1930

1,777,853

UNITED STATES PATENT OFFICE

JOSEPH MAHLER, OF JENA, GERMANY, ASSIGNOR TO THE FIRM OF CARL ZEISS, OF JENA, GERMANY

REPEATING THEODOLITE

Application filed June 18, 1929. Serial No. 371,928, and in Germany June 20, 1928.

The invention relates to a repeating theodolite which, as necessary, is provided with two clamping devices. According to the invention both clamping devices are fixed to the alidade, and one of the said clamping devices serves for clamping the alidade to the horizontal circle while the other serves for clamping the alidade to the base; further only one adjusting device is provided, which is secured to the alidade and serves for adjusting the alidade relatively to the base.

Compared with the constructions known hitherto, the one concerned in this invention has several advantages. Above all a micrometer mechanism can be dispensed with. By arranging on the alidade the two clamping devices and the only adjusting device required, it is attained that all adjusting knobs always have the same position relatively to each other as well as to the surveyor who no longer needs to grope for the different knobs. At the same time a simplification of the construction of the axial system is involved and the attendance of the apparatus made an easier one, thus allowing the surveyor to work quicker.

A suitable execution of the invention is attained by fitting on the horizontal circle a thin and easily flexible disc or the like, e. g. a ring, in such a way that the said disc can be pressed against the alidade by means of the clamping device required for clamping the alidade to the horizontal circle.

Figure 1:
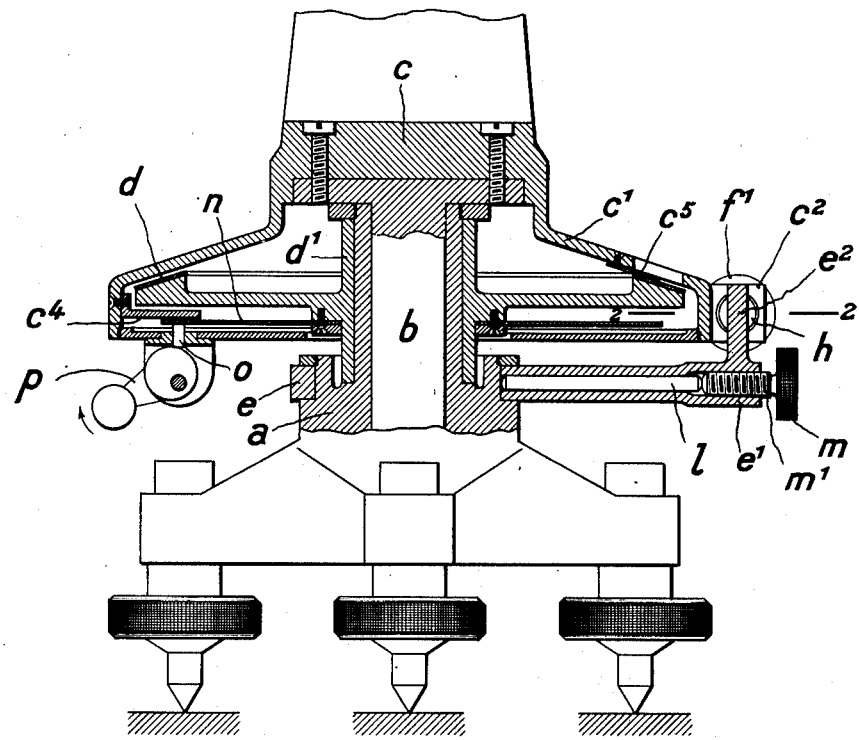
Figure 2:
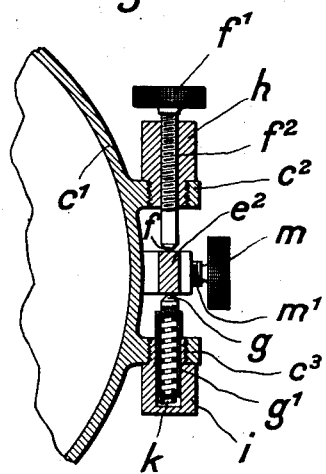

Figures 1 and 2 of the drawing show the lower part of a repeating theodolite corresponding to the invention in a section containing the vertical axis of the theodolite, and in a horizontal partial section through the micrometer device.

The centre bearing $b$ revolves in a bush $a$ of the base and is rigidly connected with a support $c$ for the telescope as well as with the casing $c^1$ (the alidade $c$, $c^1$) of the horizontal circle $d$. The horizontal circle $d$ is a part of the bush $d^1$ which frictionally rests on the bush $a$ of the base. On the said bush $a$ a ring $e$ is rotatably provided. In order to be in a position, on one hand, to couple the alidade $c$, $c^1$ with the said ring $e$ for common rotation and, on the other hand, to allow fine adjustments of the alidade $c$, $c^1$ relatively to the said ring $e$, the following arrangement is made. The ring $e$ is provided with a branch $e^1$. Against a shoulder $e^2$ of this branch there acts from one side the point $f$ of a screw $f^2$ provided with a milled head $f^1$ and, from the other side, the point $g$ of a hollow pin $g^1$. The thread of the screw $f^2$ engages in a female fitting $h$ which in its turn is screwed in a shoulder $c^2$ of the round casing $c^1$. The hollow pin $g^1$ slides in a fitted block $i$ which is screwed in a second shoulder $c^3$ of the round casing $c^1$. In the hollow pin $g^1$ there is provided a spring $k$ which continuously presses the point $g$ of the hollow pin $g^1$ against the shoulder $e^2$ of the branch $e^1$ and, consequently, the shoulder $c^2$ against the point $f$ of the screw $f^2$. In order to be in a position to adjust the ring $e$ and, consequently, also the alidade $c$, $c^1$ relatively to the bush $a$ of the base, the branch $e^1$ is provided inside with a pressure bolt $l$ which can be pressed on the said bush $a$ by means of a screw $m^1$ having a milled head $m$. The sleeve $d^1$ has an easily flexible disc $n$ screwed on. In order to have the horizontal circle $d$ clamped to the round casing $c^1$, the said disc $n$ can be pressed against a shoulder $c^4$ of the round cover $c^1$ by means of a bolt $o$ and a lever $p$ attached excentrically on the round casing $c^1$. For the reading of the horizontal angles, the round casing is provided with a vernier $c^5$ co-acting with the horizontal circle $d$.

The procedure of the repetition, which, as is well known, serves for repeating several times the measuring of the azimuthal angle so as to attain increased exactness, is as follows. The clamps $m$ and $p$ having been loosened, the alidade $c$, $c^1$ is turned relatively to the base $a$ in such a way that the telescope (not shown in the drawing) of the theodolite is in rough alignment with the first aim. Then, by turning the milled head $m$, the clamping screw $m^1$ is tightened and, by turning the milled head $f^1$ of the micrometer screw $f^2$, the telescope is brought into exact alignment with the said aim. Now, the first reading must be taken on the horizontal circle $d$. After having loosened the clamping screw $m^1$, the telescope is brought into rough alignment with the second aim. This having been done, $m^1$ is tightened another time and by turning the micrometer screw $f^2$ the telescope is brought into exact alignment with the said second aim. A second reading having been taken on the horizontal circle $d$, the disc $n$ is pressed on the shoulder $c^4$ by turning the lever $p$, whereupon the circle $d$ and the alidade $c$, $c^1$ are clamped together. Now, $m^1$ is loosened again and the telescope turned back into rough alignment with the first aim, whereby also the circle is taken along. $m^1$ having been tightened, the telescope is brought into exact alignment with the first aim by turning the micrometer screw $f^2$. Hereupon, by turning the lever $p$, the clamping of the circle $d$ with the alidade $c$, $c^1$ is to be loosened again. The above proceeding can be repeated now as many times as may be required. A final reading has to be taken and the angle between the two aims, with its vertex on the site of the instrument, calculated as a mean value by means of the quotient of the difference between the final and the first reading and of the number of repetitions.

I claim:

1. A stand for a repeating theodolite, comprising a base, a telescope support and a horizontal circle, both rotatably disposed on the base, there being a pointer fixed on the telescope support and coacting with the horizontal circle, two clamping devices attached to the telescope support, these two devices being adapted to clamp the telescope support with the base and the horizontal circle respectively, and an adjusting device provided on the telescope support and adapted to adjust the telescope support relatively to the base.

2. A stand for a repeating theodolite, comprising a base, a telescope support and a horizontal circle, both rotatably disposed on the base, there being a pointer fixed on the telescope support and coacting with the horizontal circle, a clamping device attached to the telescope support and adapted to clamp the telescope support to the base, a flexible disc fixed to the horizontal circle, means provided on the telescope support and adapted to press the said disc against the telescope support, and an adjusting device provided on the telescope support, and adapted to adjust the telescope support relatively to the base.

3. A stand for a repeating theodolite, comprising a base, a telescope support and a horizontal circle, both rotatably disposed on the base, a casing provided on the telescope support and covering the horizontal circle, there being a pointer fixed on the casing and coacting with the horizontal circle, a clamping device attached to the telescope support and adapted to clamp the telescope support to the base, a flexible disc fixed to the lower side of the horizontal circle, means provided on the telescope support and adapted to press the said disc against the telescope support, and an adjusting device provided on the telescope support and adapted to adjust the telescope support relatively to the base.

JOSEPH MAHLER.